June 30, 1942.  W. D. STONG  2,288,046
TRAILER BRAKE CONTROL
Filed Aug. 21, 1940  3 Sheets-Sheet 3
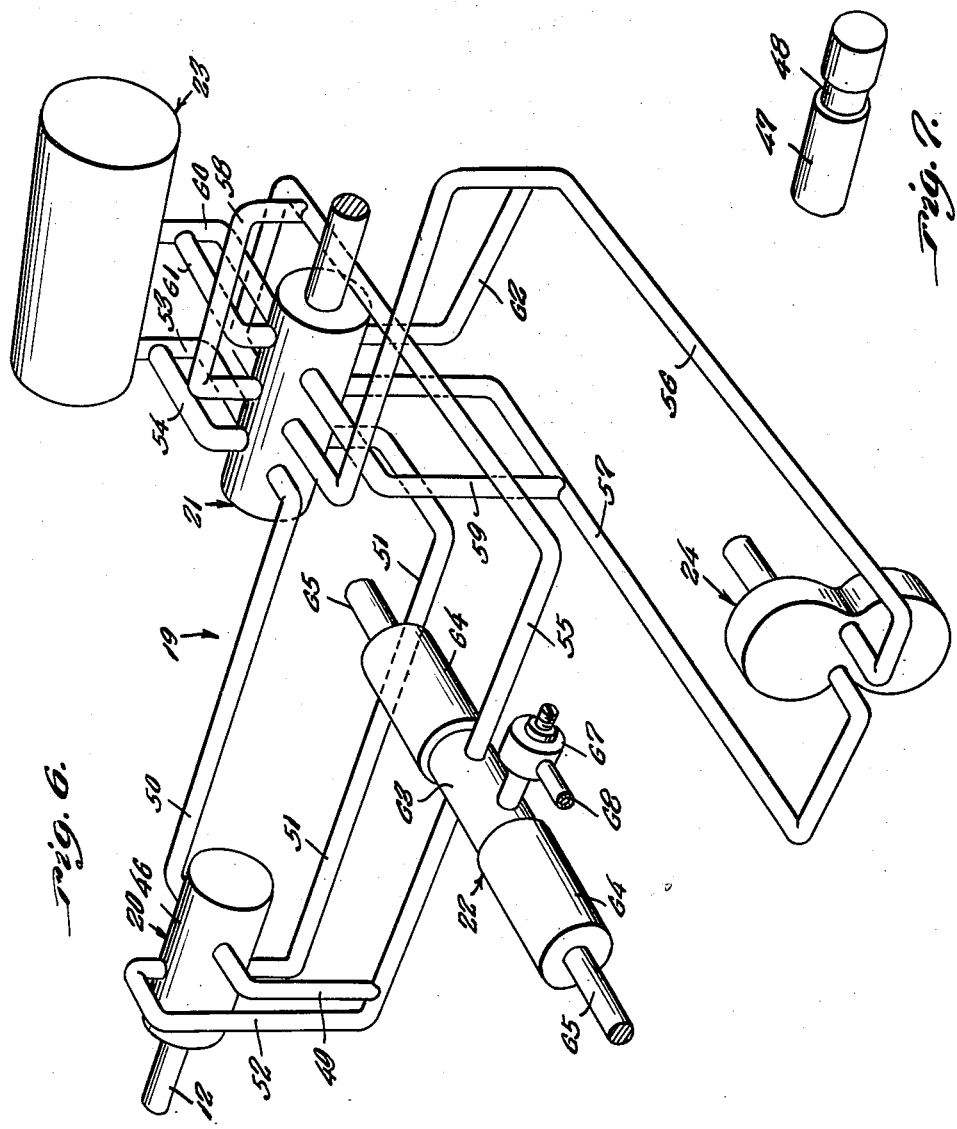
Inventor
Walter D. Stong
By Clarence A. O'Brien
Attorney Patented June 30, 1942

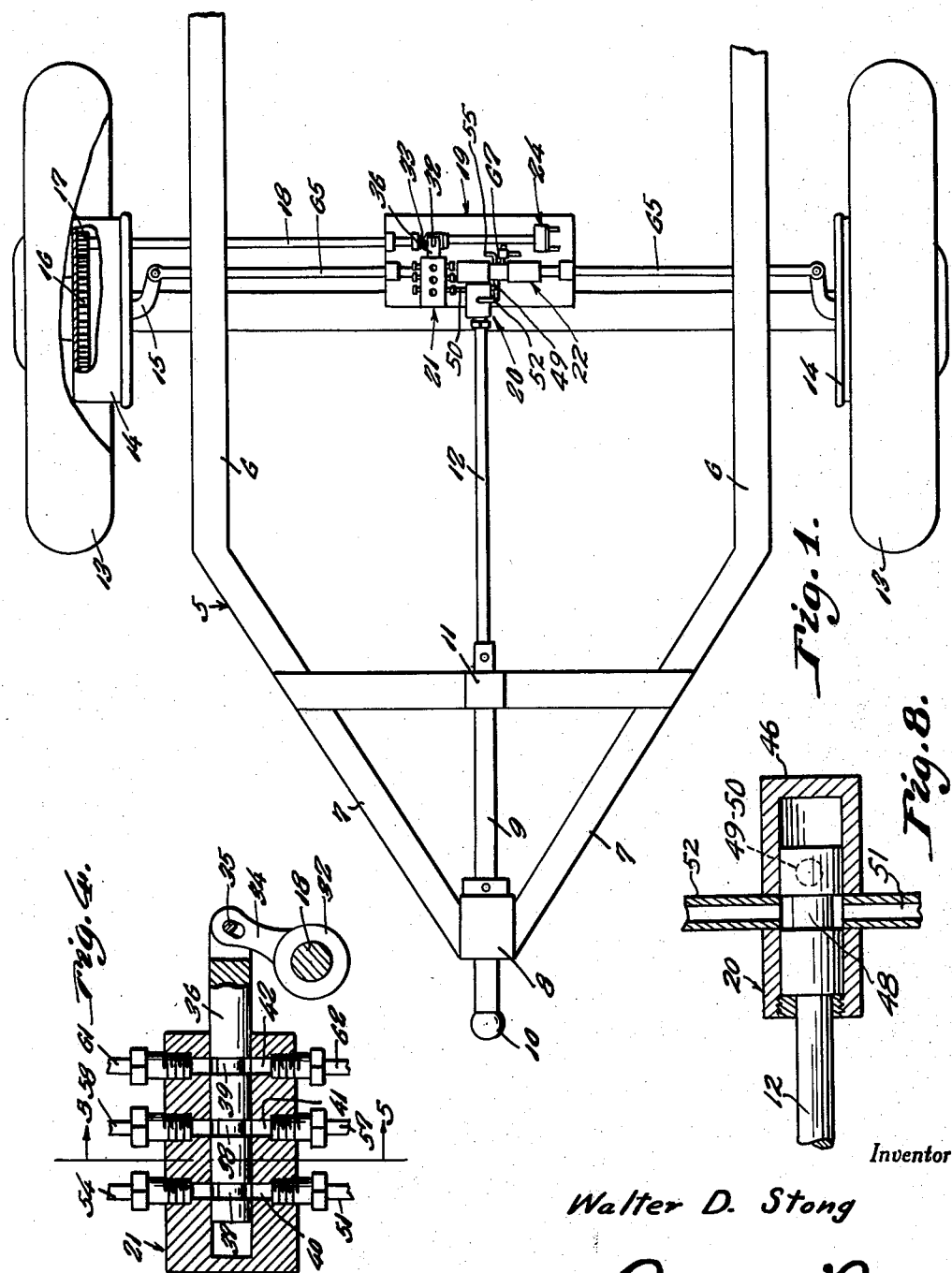

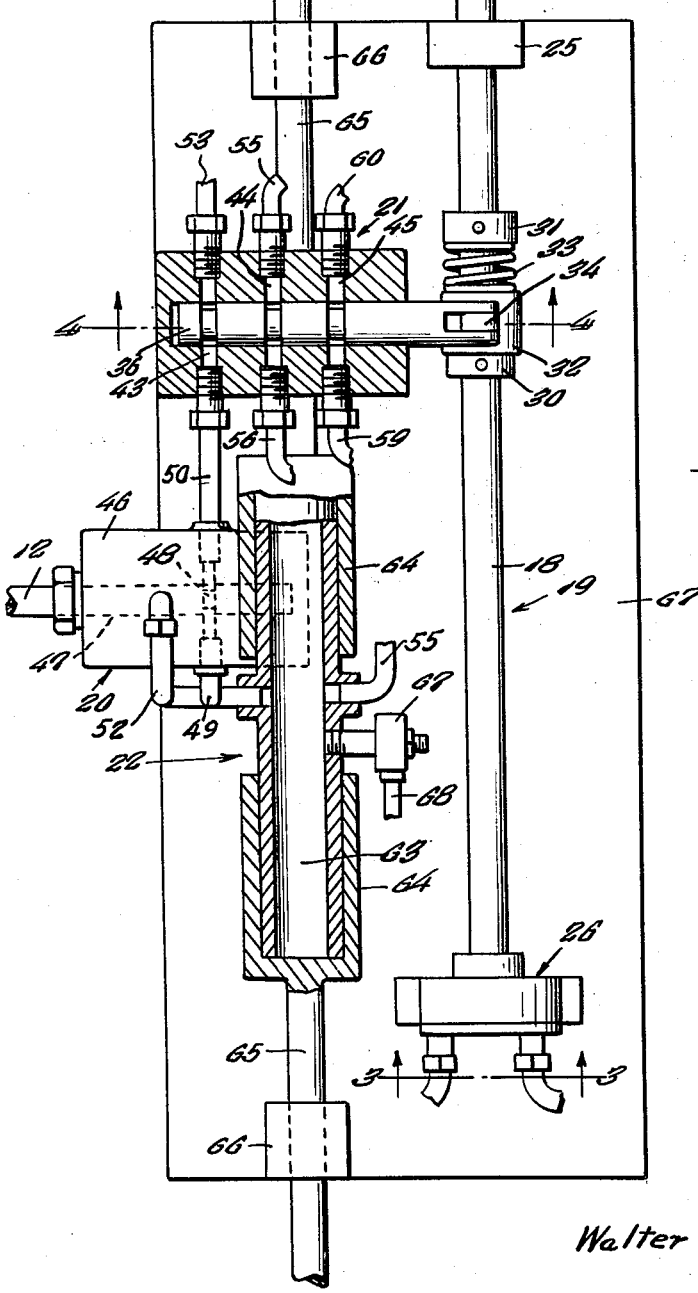
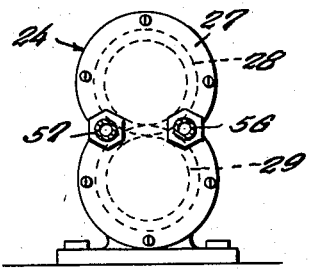
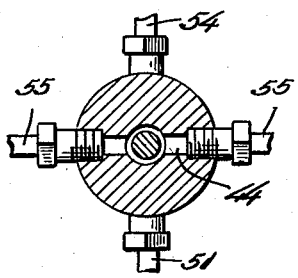

2,288,046

UNITED STATES PATENT OFFICE 2,288,046

TRAILER BRAKE CONTROL

Walter D. Stong, Flint, Mich.

Application August 21, 1940, Serial No. 353,564

1 Claim. (Cl. 188—112)

This invention appertains to new and useful improvements in brake controls for trailers and more particularly to a control which is automatically operated.

The principal object of the present invention is to provide a trailer control which will automatically act to apply the trailer brakes when the trailer begins to ride to the lead vehicle.

Another important object of the invention is to provide automatic brake control means for tractors which will automatically apply the trailer brakes when the trailer begins to move backwards while disconnected from the lead vehicle.

Other objects and advantages of the invention will become apparent to the reader of the following specification.

In the drawings:

Figure 1 represents a top plan view showing the chassis and wheel arrangement of a trailer with the brake control mounted thereon.

Figure 2 is a fragmentary horizontal sectional view through the control mechanism.

Figure 3 is a sectional view taken substantially on the line 3—3 of Figure 2.

Figure 4 is a sectional view taken substantially on the line 4—4 of Figure 2 but showing the valve element in trailer forwardly moving position.

Figure 5 is a cross section on line 5—5 of Figure 4.

Figure 6 is a diagrammatic view showing the various elements of the control system and the connections therebetween.

Figure 7 is a perspective view of the valve element of the tongue controlled valve.

Figure 8 is a longitudinal vertical sectional view through the tongue operated valve unit showing the plunger in forward position.

Referring to the drawings wherein like numerals designate like parts, it can be seen in Figure 1, that numeral 5 generally refers to the chassis frame of the trailer, this frame consisting of side members 6—6 and forwardly converging members 7—7 which merge with a slide bearing 8 through which a tongue 9 of the trailer is slidably disposed, this tongue having the usual ball head 10 and in the present instance extends rearwardly through another bearing 11 and connects to an elongated rod 12.

Numerals 13—13 denote the wheels of the trailer associated with which are the brake drums 14, and numeral 15 denotes a lever for operating the corresponding brake.

One of the wheels 13 has a gear 16 mounted to rotate therewith and meshes to drive a pinion 17 located on the outer end of a shaft 18 extending from the control apparatus generally referred to by numeral 19.

The control apparatus generally referred to by numeral 19 consists of a tongue operated valve generally referred to by numeral 20, a wheel operated valve 21, a brake operator unit generally referred to by numeral 22, a storage tank 23 and a gear pump 24.

As can be seen in Figure 2, the shaft 18 extends through bearings 25 and into the pump 26 which consists of a housing 27 and internal rotary elements 28 and 29.

On the shaft 18 is a pair of spaced collars 30 and 31 and between these collars is a hub 32 rotatable on the shaft 18, but frictionally held against the collar 30 by a compression spring 33 interposed between the hub 32 and the collar 31. Thus the hub 32 will rotate with the shaft 18 until it meets some substantial resistance.

Projecting from the hub 32 is an arm 34 which has a pin and slot 35 with a plunger 36 which serves as the valve element of the wheel operated valve generally referred to by numeral 21. This valve plunger 36 has circumferentially extending grooves 37, 38 and 39 which are registrable either with the vertical ports 40, 41 and 42, or with the horizontal ports 43, 44 and 45.

The tongue controlled valve 20 consists of a cylinder 46 in which a valve piston 47 operated by the tongue operated rod 27 is operative, this plunger 47 having a circumferentially extending groove 48 registrable with either the tube 49 and 50 or the tubes 51 and 52.

As can be seen in Figure 6, the tube 50 extends to one of the ports 43 of the valve 21 and from the other end of the port 43 a pipe 53 extends to the fluid reservoir 23. A branch pipe 54 extends from the pipe 53 to communicate with one end of the port 40 (see Figure 4), while a tube 51 extends from the other end of the port 40 and connects to the cylinder 46 as aforementioned.

The tube 52 extends to the brake operator unit 22 and from the brake operator unit 22 extends a pipe 55 which connects with one end of the port 44, while the other end of the port 44 has a pipe 56 extending therefrom to one side of the pump 24. The other side of the pump 24 has a pipe 57 extending therefrom to connect to one side of the port 41, while from the other end of the port 41 extends a pipe 58 to connect to the aforementioned pipe 55. A branch pipe 59 extends from the aforementioned pipe 57 and communicates with the port 45 at one end thereof, while a pipe 60 extends from the other end of the port 45 to the reservoir 23. A branch pipe 61 extends from the pipe 60 to communicate with the upper end of the port 42, while from the other end of the port 42, a pipe 62 extends to connect to the aforementioned pipe 56.

As can be clearly seen in Figure 2, the brake operator unit 22 consists of an elongated barrel 63 provided with a slidable cylinder 64 at each end thereof. The outer ends of these cylinders 64 are closed and have the push rods 65 extending therefrom and through suitable guides or bearings 66 on the platform 67 of the control apparatus.

Numeral 67 denotes a by-pass valve in a conduit 68 extending from the barrel 63 to the storage tank 23 and thus the pressure can be set at a desired value for operation of the operator unit 22.

In understanding the operation of the apparatus it will be understood that when the trailer 5 is being pulled by its tongue 9, the valve plunger 47 (see Fig. 7) in the tongue operated valve unit 20 is shifted to the forward interior of the encasing barrel, the reduction 48 thereon communicating the pipes 51 and 52, while blocking the pipes 49 and 50. This position of parts is for forward driving operation.

Coincident with this position of the valve 20 is the position of the arm 34 (see Fig. 4) on the pump drive shaft 18 (see Fig. 1). The pump shaft 18 is driven by the large gear 16 on one of the trailer wheels, the arm 34 being held rearwardly by the spring clutch 31, 33 as shaft 18 rotates in a direction corresponding to forward motion of the trailer. This position of the arm 34 holds the valve plunger 36 in a rearwardly advanced position, communicating the pipes 61, 62, the pipes 54, 51, and the pipes 58 and 57, it being observed that the pipe 58 is connected to the pipe 55.

It can now be seen that with the trailer in forward motion, the pump 24 is being driven, and this action of the pump draws fluid from the reservoir 23 and into pipe 61, from where it passes through the valve 21 to the pipe 62 and from there to the pipe 56 and the input side of the pump 24. Fluid is forced from the pump 24 by way of the pipe 57 through the valve 21 to the pipe 58 and from there to the pipe 55 which goes to the intake side of the barrel 63 of the brake operator 22. With the valves in the position above described for forward travel of the trailer while being pulled by some lead vehicle, fluid will merely flow through the barrel 63 to the pipe 52 and around the valve plunger 47 at the reduction 48 (see Fig. 7) to the pipe 51, which pipe is in communication with the pipe 54 by reason of the position of the valve plunger 36 so that the fluid can return to the reservoir 23. Thus no braking action takes place.

Braking action takes place when, for instance, the trailer over-rides the lead vehicle in going down an incline. When this act takes place, the shell 46 of the valve 20 (see Fig. 6) will ride the plunger 47 with the result that the plunger 47 will be rearwardly located in the valve 20, closing off the pipes 52, 51 so that the plunger 47 will prevent a circulation of fluid, to the end that with the pump 24 operating, pressure will be built up in the brake barrel 63, with the result that the cylinders 64, 64 will be extended to operate the brake actuating rods 65, 65. This braking operation takes place, of course, with the arm 34 and plunger 36 in rearwardly advanced position.

Emergency braking operation will take place, for instance, when the trailer is being pulled up an incline and suddenly breaks away from the lead vehicle and starts rolling down the incline. In this emergency the plunger 47 of the valve 20 is in forward position with the reduced portion 48 communicating the pipes 52, 51, but the wheel operated valve 21 goes into action, the clutch 31, 33 moving the arm 34 and the valve plunger 36 to a forward position, as shown in Fig. 2. This position of the valve plunger 36 shuts off the circulation of fluid through the system, because when the valve 21 is in this position, it is necessary that the pipes 49 and 50 be in communication by way of the reduction 48 in the plunger 47 (see Fig. 7). However, as the system will be interrupted due to the forward position of the valve plunger 47 in the valve 20, pressure will build up in the valve 22, operating the brake control rods 65, 65. In this manner, the trailer is prevented from running free after breaking away from its lead vehicle.

As above stated, in the emergency brake operation of the system, the factor resulting in effective operation of the brakes is the reverse operation of the pump shaft 18, controlling the valve 21 and the remaining in position of the valve plunger 47 of the valve 20, the latter plunger 47 being the barrier which would permit the system to function freely without braking operation, if the trailer was being backed up by a lead vehicle.

In this latter instance, that is where it is desired to back up the trailer, rearward pressure on the tongue 9 results in a rearward shifting of the plunger 47 of the valve 20, moving the reduced portion 48 to communicate the pipes 49, 50. Of course, the valve 21 remains in the position as when the system was operating under the emergency, but now the system is complete for circulatory flow of fluid. It can be seen that the pump 24 will now draw fluid from the reservoir 23 to the pipe 60, through the valve 21 to the pipe 59 and from there to the pipe 57 and the intake side of the pump 24. The pump will force fluid through the pipe 56 and through the valve 21 to the pipe 55, through the valve barrel 63 to the pipe 49 and from there by way of the reduction 48 in the plunger 47 to the pipe 50, and again through the valve 21 to the pipe 53 and the reservoir 23. Thus the brake operator 22 will not be under pressure and the trailer will be free to be backed up or moved rearwardly to an extent desired.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination, a trailer having wheels, brakes associated with the wheels, a slidable draft tongue for the trailer, a brake control mechanism, a fluid reservoir, a pump, a valve controlled by the tongue, said reservoir, pump and valve being in communication, and an expansible brake operator in communication with the pump and valve and adapted to be expanded when the valve is opened to communicate the reservoir with the brake operator, and means actuated by the wheels of the trailer for controlling the said expansible operator independently of the valve when the trailer moves independently of a lead vehicle in a rearward direction.

WALTER D. STONG.